United States Patent [19]

Nishi et al.

[11] Patent Number: 5,562,012

[45] Date of Patent: Oct. 8, 1996

[54] INDUSTRIAL ARTICULATED ROBOT

[75] Inventors: Masanori Nishi; Hideaki Watanabe, both of Saitama, Japan

[73] Assignee: Kabushiki Kaisha Yaskawa Denki, Fukuoka, Japan

[21] Appl. No.: 331,571

[22] PCT Filed: Mar. 29, 1994

[86] PCT No.: PCT/JP94/00504

§ 371 Date: Dec. 21, 1994

§ 102(e) Date: Dec. 21, 1994

[87] PCT Pub. No.: WO94/22643

PCT Pub. Date: Oct. 13, 1994

[30] Foreign Application Priority Data

Mar. 31, 1993 [JP] Japan .................................. 5-098826

[51] Int. Cl.⁶ ...................................................... B25J 11/00
[52] U.S. Cl. .................................. 74/490.01; 248/281.11; 414/917; 901/15
[58] Field of Search ......................... 74/490.01, 490.03; 248/281.11; 414/917; 901/15

[56] References Cited

U.S. PATENT DOCUMENTS 5,357,824  10/1994  Hashimoto ........................... 74/490.03

FOREIGN PATENT DOCUMENTS 3-104574  5/1991  Japan .
2303778  12/1991  Japan .

Primary Examiner—Allan D. Herrmann
Attorney, Agent, or Firm—Morrison Law Firm

[57] ABSTRACT

An industrial articulated robot that can be inclined in forward and backward directions has a parallel link mechanism that includes a lower arm and a connecting link in parallel to the arm. Bottom ends of the lower arm and connecting link are supported at a lower base. An upper base connects upper ends of the lower arm and connecting link so that they can be rotated. A turning section that rotates horizontally is provided above the upper base. An upper arm that can be inclined in upper and lower directions is supported at a position shifted relative to a turning axis of the turning section so that the upper arm and the lower arm do not interfere with each other in operation.

8 Claims, 1 Drawing Sheet

INDUSTRIAL ARTICULATED ROBOT

TECHNICAL FIELD

This invention relates to an industrial articulated robot.

BACKGROUND ART

Hitherto, there are disclosed industrial articulated robots comprising a turning bed turning in a horizontal direction on a fixed base, a lower arm provided so that it can be inclined in forward and backward directions on the turning bed, an upper arm provided at the front end portion of the lower arm so that it can be inclined in upper and lower directions, a drive link provided so that it can be inclined in upper and lower directions on the turning bed, and a connecting link in parallel to the lower arm, which connects the upper arm and the drive link, whereby parallel link mechanism is constituted by the upper arm, the lower arm, the drive link and the connecting link, the industrial articulated robot body further comprising a turning arm rotatable about the axis along the length direction of the upper arm, and a wrist portion which can be inclined in a direction vertical to the turning axis of the turning arm (e.g., Tokkaihei No. 2-31691 (Japanese Patent Application Laid Open No. 31691/1990), Tokkaihei No. 3-202288 (Japanese Patent Application Laid Open No. 202288/1991), Tokkaihei No. 3-245980 (Japanese Patent Application Laid Open No. 245980/1991)).

However, when the turning bed is turned, it is turned in such a manner to support all weights of the lower arm, the upper arm, the turning arm, and the wrist portion which are integrally loaded on the turning bed. As a result, there were the problems that the structure of turning device for driving the turning bed becomes large and it is difficult to increase turning speed.

As means for solving this problem, there is disclosed an industrial articulated robot in which, as a parallel link mechanism including lower arm, a turning section supported at the front end portion of the lower arm so that it is turned in a horizontal direction is provided in place of directly connecting the upper arm to the lower arm front end portion so that it is maintained to be horizontal even if the lower arm is inclined; and an upper arm extending in a lateral direction from the turning section, a turning arm rotatable about the axis along the length direction of the upper arm, and a wrist portion which can be inclined in a direction vertical to the turning axis of the turning arm are further provided, whereby the turning section is adapted to support only weights of the upper arm, the turning arm and the wrist portion, thus to reduce weight as load of the turning section (e.g., Tokkaihei No. 3-104574 (Japanese Patent Application Laid Open No. 104574/1991)).

However, in the case of the Tokkaihei No. 3-104574 of the prior art, the upper arm is fixed horizontally or at a fixed angle at the turning section supported at the lower arm front end portion so that it is horizontally turned. For this reason, the upper arm is rotated in upper and lower directions together with the turning section by drive link in parallel to the turning section within the parallel link mechanism through connecting link supported at turning section end portion so that it can be rotated similarly to the conventional Tokkaihei No. 2-31691, etc.

Accordingly, since the upper arm and the lower arm carry out operation as two links intersecting with each other within parallelogram of the parallel link mechanism, the upper arm and the lower arm interfere with each other. Thus, an angle (relative angle) that the upper arm and the lower arm form was restricted, resulting in the drawback that the operation region of the upper arm is narrowed.

DISCLOSURE OF THE INVENTION

An object of this invention is to provide an industrial articulated robot which can lessen weight of the turning section and which can broaden the operation range of the upper arm by eliminating restriction on relative angle that the upper arm and the lower arm form.

This invention is directed to an industrial articulated robot in which a parallel link mechanism is constituted by a lower arm supported on a lower base so that it can be inclined in forward and backward directions, a connecting link in parallel to the lower arm and supported at the lower base so that it can be inclined in forward and backward directions, and an upper base connecting the front end of the lower arm and the front end of the connecting arm so that they can be rotated; and a turning section supported at the upper base so that it is turned in horizontal direction, and an upper arm provided at the turning section are provided, characterized in that the upper arm is supported at the position shifted relative to the turning axis of the turning section so as to permit the upper arm to be inclined in upper and lower directions.

For this reason, the possibility that the lower arm and the upper arm interfere with each other is eliminated. As a result, operation angle of the upper arm is broadened. Thus, operation area most important for work is broadened.

Accordingly, in accordance with this invention, it is possible to advantageously provide a light weight and compact industrial articulated robot adapted so that the upper arm and the lower arm do not interfere with each other, and the operation region of the upper arm is broad.

BEST MODE FOR CARRYING OUT THE INVENTION

This invention will now be described in accordance with the embodiment shown.

Figure 1:
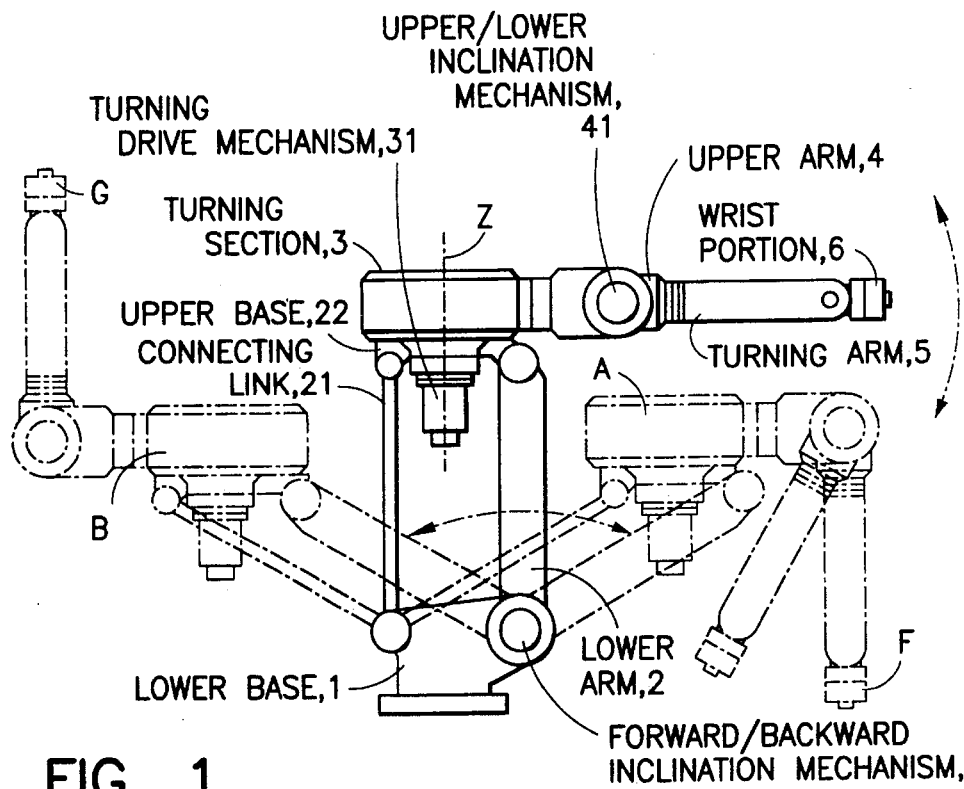
FIG. 1 is a side view showing an embodiment of this invention.
Figure 2:
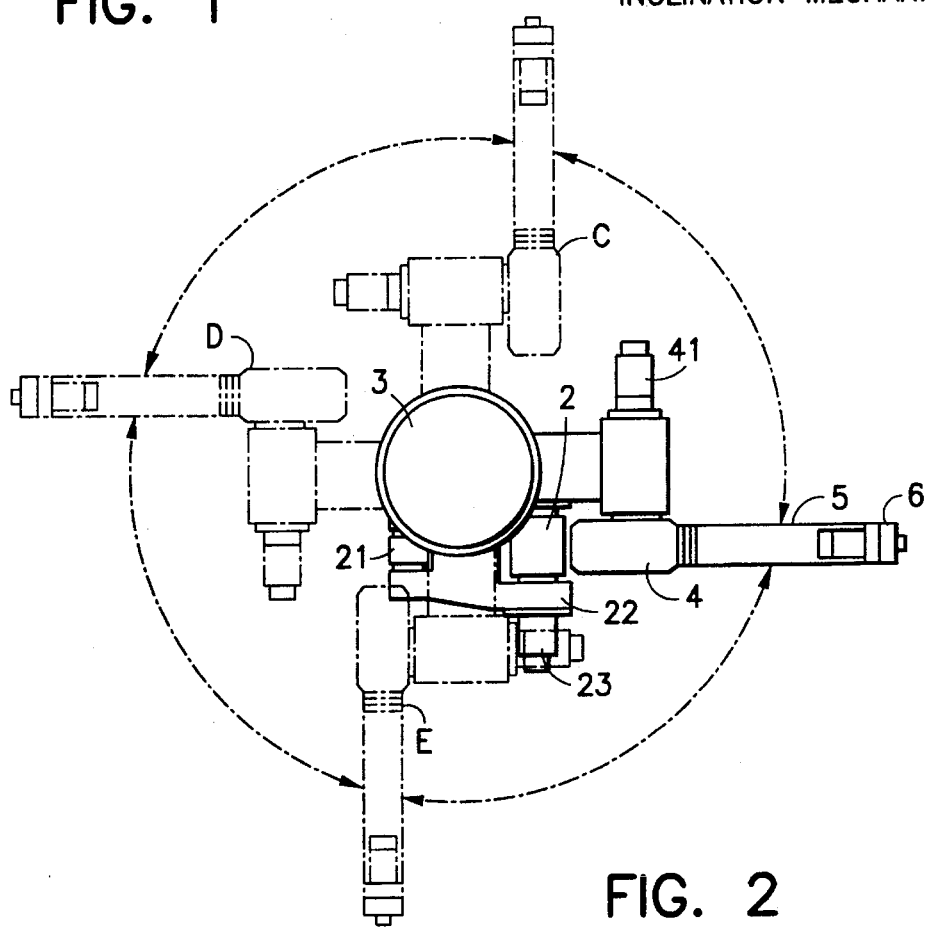
FIG. 2 is a plan view of FIG. 1.

FIG. 1 is a side view showing the embodiment of this invention and FIG. 2 is a plan view thereof.

In the figure, a parallel link mechanism is constituted by a lower arm 2 supported at a lower base 1 so that it can be inclined in forward and backward directions, a connecting link 21 in parallel to lower arm 2 and supported at lower base 1 so that it can be inclined in forward and backward directions, and an upper base 22 connecting the front end of lower arm 2 and the front end of connecting link 21 so that they can be rotated. At lower base 1, a forward/backward inclination mechanism 23 for inclining lower arm 2 in forward and backward directions is provided. At upper base 22 of the parallel link mechanism, a turning section 3 supported so that it is turned in horizontal direction is provided. Thus, this turning section 3 is turned by a turning drive mechanism 31 provided at upper base 22. Upper arm 4 supported so that it can be inclined in upper and lower directions is provided at the position shifted relative to turning axis Z of turning section 3. Thus, this upper arm 4 is inclined by an upper/lower inclination mechanism 41 provided at turning section 3. At the front end portion of upper arm 4, turning arm 5 which can be rotated about turning axis Z along length direction of upper arm 4 and wrist portion 6 which can be inclined in a direction vertical to the turning axis of turning arm 5 are provided.

By inclining lower arm 2 by using forward/backward inclination mechanism 23, it is possible to move turning section 3 to positions shifted in forward and backward directions from the center like positions of A, B indicated by single dotted lines in FIG. 1. By turning the turning section 3, it is possible to positionally change upper arm 4 in a range of 360 degrees about the turning axis Z like positions of C, D, E shown in FIG. 2. By inclining upper arm 4 in upper and lower directions, it is possible to greatly move wrist portion 6 in upper and lower directions like positions of F, G.

As stated above, when upper arm 4 is turned, it is sufficient to turn the turning section 3 mounted on the upper base of lower arm 2. Accordingly, weight on the front end side from upper arm 4 serves as load. As a result, it is unnecessary to turn lower arm 2. Thus, since it does not serves as load of turning section 3, load of turning section 3 is reduced.

Further, since upper arm 4 which can be inclined in upper and lower directions is provided at the position shifted relative to the turning axis of turning section 3, the possibility that lower arm 2 and upper arm 4 interfere with each other is eliminated. As a result, operation angle of upper arm can be broadened. Thus, operation area most important for work can be broadened.

INDUSTRIAL APPLICABILITY

This invention can be utilized, when applied to industrial articulated robots, in the field for manufacturing and providing industrial articulated robots which have broad operation region, and is light in weight and compact.

What is claimed is:

1. An industrial articulated robot, comprising:

a lower base having first and second sides;

a lower arm having a first end supported at said first side of said lower base;

first means for inclining said lower arm in forward and backward directions;

a connecting link parallel to said lower arm;

said connecting link having a first end supported at said second side of said lower base so that said connecting link can be inclined in forward and backward directions by said first means for inclining;

an upper base having first and second ends;

said first end connected to a second end of said lower arm and said second end connected to a second end of said connecting link so that said lower arm and said connecting link can be rotated;

a turning section disposed at a top of said upper base;

means for turning said turning section in a direction parallel to said top;

an upper arm supported by said turning section;

second means for inclining said upper arm in upper and lower directions; and said upper arm disposed at a position shifted relative to a turning axis Z of said turning section effective to avoid interference between said upper arm and said lower arm.

2. The industrial articulated robot according to claim 1, wherein said means for turning comprises a turning drive mechanism mounted at a bottom of said upper base.

3. The industrial articulated robot according to claim 2, wherein said means for turning turns said turning section in said direction in a range of 360 degrees about said turning axis Z.

4. The industrial articulated robot according to claim 1, wherein said first means for inclining comprises a forward/backward inclination mechanism mounted on said first side of said lower base.

5. The industrial articulated robot according to claim 4, wherein by inclining said lower arm in forward and backward directions by said first means for inclining, said turning section is movable to positions shifted in forward and backward directions from a center position.

6. The industrial articulated robot according to claim 1, wherein said second means for inclining comprises an upper/lower inclination mechanism mounted on said turning section.

7. The industrial articulated robot according to claim 1, wherein said upper arm includes:

a turning arm disposed at a front end of said upper arm;

said turning arm being rotatable about a turning axis along a length direction of said upper arm;

a wrist portion disposed at a front end of said turning arm; and said wrist portion being inclinable in a direction vertical to said turning axis of said turning arm.

8. The industrial articulated robot according to claim 7, wherein by inclining said upper arm in upper and lower directions by said second means for inclining, said wrist portion is movable in upper and lower directions.

* * * * *